Oct. 3, 1961 S. I. BATKIN 3,002,609
CONTAINER WITH INTERNAL INSERT
Filed April 28, 1958 2 Sheets-Sheet 1

INVENTOR
STANLEY I. BATKIN
BY
ATTORNEY

Oct. 3, 1961     S. I. BATKIN     3,002,609
CONTAINER WITH INTERNAL INSERT
Filed April 28, 1958     2 Sheets-Sheet 2
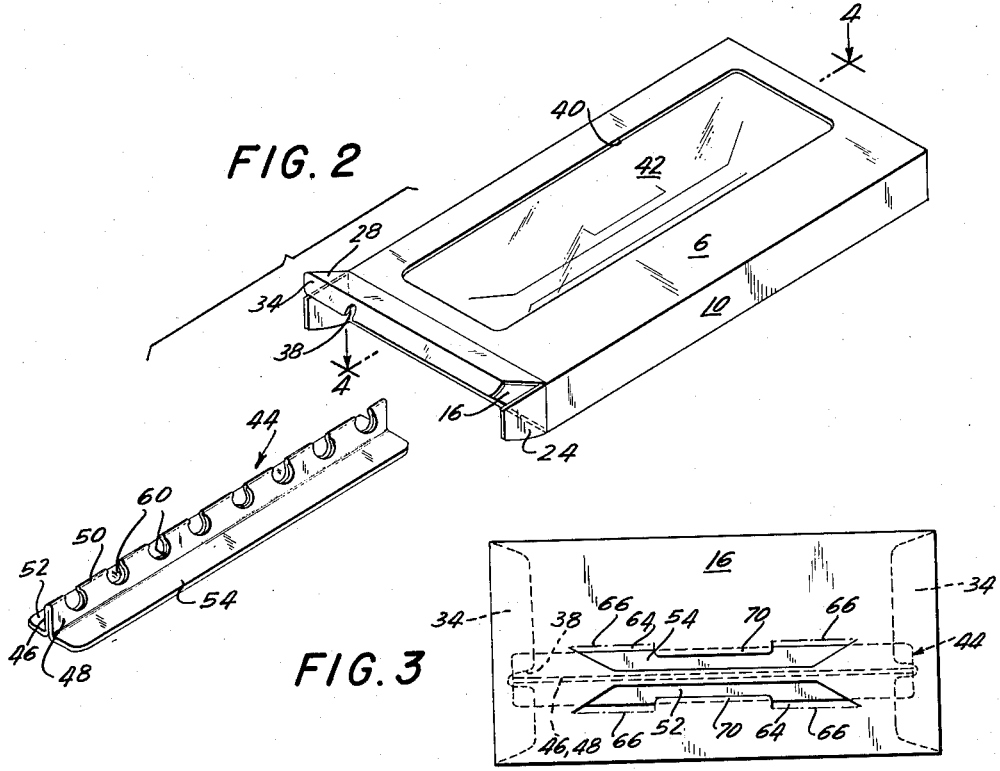
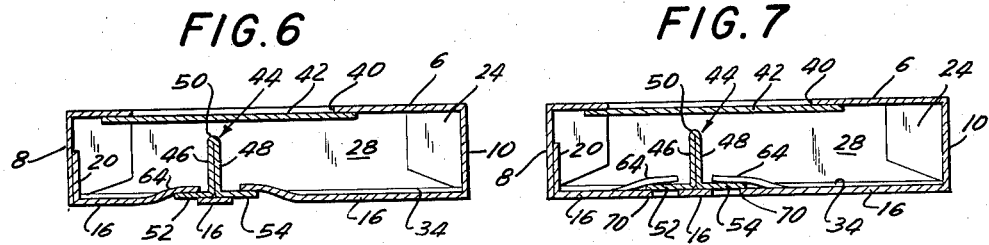
INVENTOR
STANLEY I. BATKIN
BY
ATTORNEY

United States Patent Office 3,002,609
Patented Oct. 3, 1961

3,002,609
CONTAINER WITH INTERNAL INSERT
Stanley I. Batkin, New Rochelle, N.Y.
Filed Apr. 28, 1958, Ser. No. 731,488
13 Claims. (Cl. 206—45.14)

The present invention relates to a container having an insert therein capable of functioning as a partition or as an article-supporting means, and relates particularly to the manner in which the insert is formed and supported within the container. In its more specific aspects the insert is excised from one of the walls of the container, thereby leaving an opening in that wall through which the contents of the container may be viewed.

There are many instances in which it is desired that a container be provided with a removable insert the position of which is fixed within the container but which can be removed from the container. Such an insert may function as a partition, dividing the container into a plurality of compartments. It may also function as a means for supporting, locating or cushioning the articles which are adapted to be stored within the container, and it is to achieve this latter end that the insert here specifically disclosed is specially designed. The advantages inherent in the removability of such inserts are apparent. If the insert functions as a partition it permits the container to be used in an uncompartmented manner when large articles are to be contained therein. If the insert is to function as an article support, it permits the articles to be mounted on the insert, the insert and the articles mounted thereon then being placed into or removed from the container as a unit. However, when the insert is inside the container means must be provided to retain it in its desired position.

Modern packaging theory emphasizes the importance of visual impact. Consequently containers are often provided with windows or viewing openings through which the contents of the container may be seen. In accordance with a specific aspect of the present invention the material which is cut out from a wall of the container in order to produce a viewing opening is utilized to form the insert.

Further in accordance with the present invention, the container body is provided with flaps so constructed as to cooperate with the insert structure and hold the insert firmly in position in the container. More specifically, the insert may be slid into the container through an open end thereof after the container proper has been erected, the structure which closes the open end of the container engaging with the insert so as to retain it in position, the insert being readily removable when the end of the container is again opened.

To accomplish the above the insert is provided with laterally directed bottom flanges which rest on the bottom wall of the container, flaps being formed integrally with the bottom wall which engage over the insert flanges. In addition, the container is provided with flaps extending inwardly from the ends thereof which engage with the ends of the insert. The bottom wall flaps, and the bottom wall itself, prevent the insert from moving up or down. The flaps at the ends of the container prevent the insert from moving endwise. All of the flaps prevent the insert from moving laterally. In addition, when the upstanding portion of the insert is defined by a pair of foldably related walls which lie alongside one another, the engagement between those walls and the flaps at the ends of the container serve to retain the walls in upstanding parallel relation.

To the accomplishment of the above, and to such other objects as may hereinafter appear, the present invention relates to the construction of a container-insert combination as defined in the appended claims, and as described in this specification, taken together with the accompanying drawings, in which:

FIG. 2 is an exploded view of the container with one end open and with the insert in erected position and ready to be slid into the container;

FIG. 3 is a bottom plan view of the container with the insert in position;

FIG. 6 is a cross sectional view taken along the line 6—6 of FIG. 5; and

FIG. 7 is a cross sectional view taken along the line 7—7 of FIG. 4.

Figure 1:
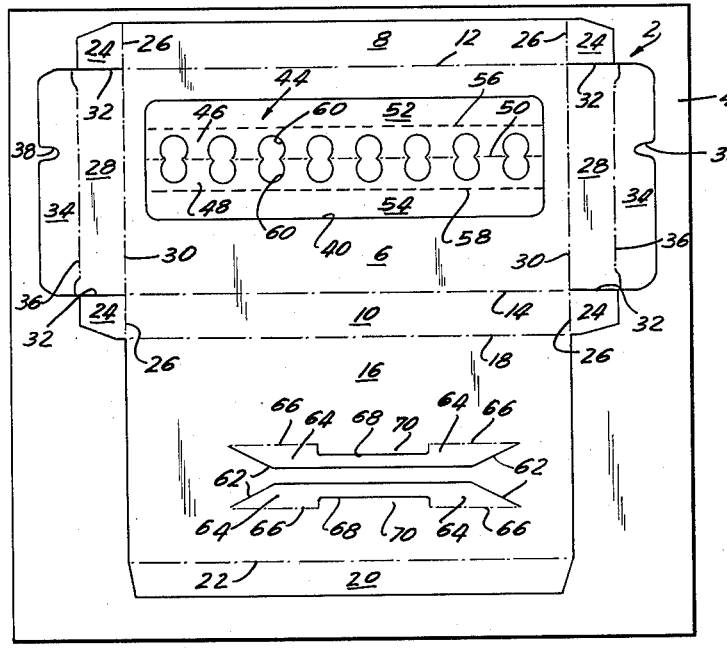
FIG. 1 is a top plan view of the blank from which the container and insert are formed.

The container and insert are adapted to be formed from the blank generally designated 2 (see FIG. 1) which may be cut from a larger sheet 4 of appropriate structural material such as cardboard, corrugated board or the like. The container comprises a top wall panel 6 to which side wall panels 8 and 10 are connected by means of foldlines 12 and 14 respectively. A bottom wall panel 16 is connected to the side wall panel 10 by foldline 18, and carries a flap 20 connected thereto by foldline 22. The side walls 8 and 10 are provided with abbreviated end flaps 24 connected to opposite ends thereof by foldlines 26 and end closure flaps 28 are connected to the ends of the top wall 6 by foldlines 30, those end closure flaps 28 being separated from the abbreviated end flaps 24 by means of cuts 32. Additional flaps 34 are connected to the end flaps 28 by means of foldlines 36. The additional flaps 34 are provided with opposed slots 38 extending inwardly from the outer edges thereof.

An appreciable portion of the bottom wall 6 is excised therefrom so as to produce a window opening 40 which may be covered by a transparent plastic sheet 42 adhesively or otherwise secured to the undersurface of the top wall panel 6. The material excised from the top wall 6 defines the blank from which is formed the insert, generally designated 44. As here disclosed that insert comprises a pair of wall panels 46 and 48 connected to one another by foldline 50 and having flange panels 52 and 54 connected respectively to the panels 46 and 48 by foldlines 56 and 58 respectively. A series of aligned and communicating openings 60 are formed in the panels 46 and 48.

The bottom wall panel 16 is provided with cuts 62 which form spaced opposed flaps 64 pivotable about foldlines 66. As here specifically disclosed additional cuts 68 extend into the bodies of the flaps 64 so as to produce tabs 70 substantially rigid with the bottom wall panel 16 and with respect to which the flaps 64 are movable.

As here specifically disclosed the container and insert combination are specially designed for the packaging and display of a series of articles such as electric Christmas tree lamps, these lamps comprising a bulb 72, a socket 74 and associated wiring 76.

Figure 4:
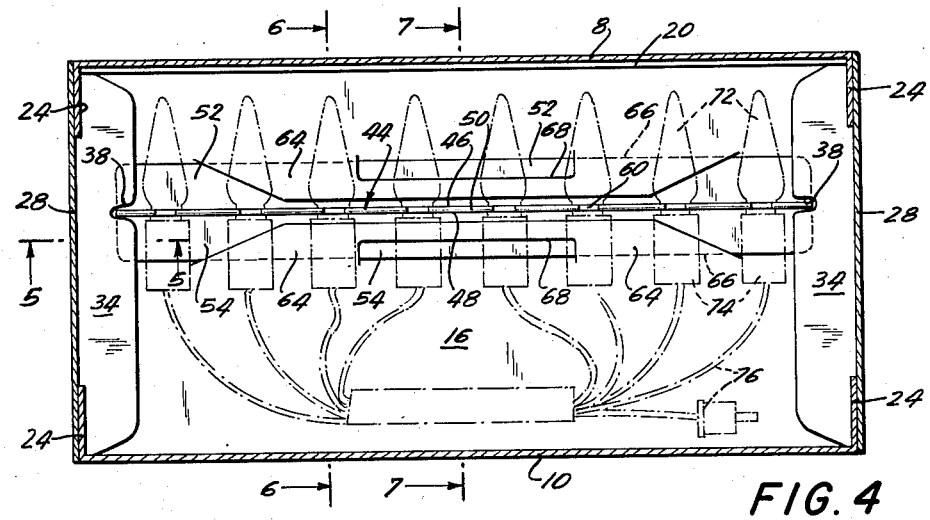
FIG. 4 is a cross sectional view taken along the line 4—4 of FIG. 2 but showing the container and insert assembled, a series of objects, adapted to be supported by the insert, being shown in broken lines.

In use the container, after the insert 44 has been excised therefrom and the transparent plastic sheet 42 has been applied to the top wall panel 6, is erected by adhesively or otherwise securing the flap 20 to the side wall 8. The insert 44 is erected by folding the panels 46 and 48 about the foldline 50 so that they lie alongside one another, and by folding the flange panels 52 and 54 at right angles to the panels 46 and 48 respectively, all as may be seen in FIG. 2. The openings 60 in the panels 46 and 48 are then disposed so as to receive the necks of the bulbs 72, as may be seen from FIG. 4, thereby supporting an array of bulbs, sockets and associated wire. After the insert 44 has been thus integrated with the device which it is adapted to support and position, it is then slid into the container proper through an open end thereof, with the insert flanges 52 and 54 resting on the bottom wall panel 16 of the container. As the insert 44 is slid into the container the flaps 64 on the bottom wall panel 16 are pushed upwardly so that the insert flanges 52 and 54 slide thereunder, and preferably over the tabs 70 which remain substantially rigid with the bottom wall panel 16. To this end the spacing between the opposed free edges of the flaps 64 is less than the distance between the outer edges of the flanges 52 and 54 of the erected insert 44 but greater than the combined thickness of the insert panels 46 and 48, and the spacing between the opposed edges of the tab 70 is also somewhat less than the distance between the outer edges of the insert flanges 52 and 54. The location of the flaps 64 on the bottom wall 16 is such that when the insert 44 is engaged by the flaps 64 it will be so positioned that the bulbs 72 carried thereby will be beneath the window 40, where they are exposed for view.

Figure 5:
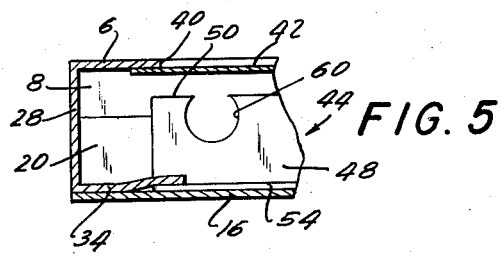
FIG. 5 is a fragmentary cross sectional view taken along the line 5—5 of FIG. 4.

The flaps 34 foldably secured to the end flaps 28 are adapted to extend along the upper surface of the bottom wall panel 16, and the inwardly extending slots 38 in their free ends are adapted to be located substantially midway between the opposed free ends of the flaps 64. In addition, the flaps 34 extend inwardly from the ends of the container a distance sufficient for the slots 38 to have received therein the upstanding insert panels 46 and 48, portions of the flaps 34 therefore overlying the ends of the insert flanges 52 and 54 (see FIGS. 4 and 5).

It will therefore be apparent that when the container is completely closed the insert 44 and the articles which it carries will be locked and retained in position within the container. The insert flanges 52 and 54 are frictionally retained between the flaps 64 and the tabs 70 and are pressed by the flaps 64 against the bottom wall panel 16. The insert 44 will thus be prevented from moving up or down. Since the ends of the insert panels 46 and 48 are snugly received within the slots 38, the insert 44 will be positively prevented from moving endwise, toward either of the end walls 28, and will also be positively prevented from moving laterally toward either of the side walls 8 or 10. In addition, the slots 38, as well as the flaps 64, will prevent the insert 44 from spreading laterally by unbending around the foldline 50.

It will be noted that the structure here disclosed permits the articles to be displayed to be mounted on the insert 44 entirely externally of the container, the articles and the insert 44 then being movable into the container as a unit. This greatly simplifies the operation of packaging. By the same token, the insert and the articles which it carries can readily be removed from the container merely by opening one end thereof, grasping the end of the insert there exposed, and sliding it out endwise from the container.

The fact that the insert 44 is formed from the very same material which must be excised from the top wall panel 6 in order to produce the viewing opening 40 makes for economy, but that particular mode of formation of the insert 44 is not essential. Moreover, while the insert 44 has been here disclosed in the form of an article support, it will be apparent that it could be designed to function solely as a removable partition for subdividing the container into a plurality of compartments whenever that is desired. Furthermore, the insert could be so constructed as to support articles therein without having an upstanding wall. Other variations may be made in the present invention when compared with the single embodiment here specifically disclosed, all within the spirit of the invention as defined in the following claims.

I claim:

1. A container comprising a bottom wall having cuts producing spaced opposed flaps, an insert comprising an upstanding wall and laterally directed bottom flanges, said bottom flanges extending along said bottom wall and under said flaps, and end walls with flaps foldable inwardly so as to lie along said bottom wall, said upstanding wall of said insert having a length greater than the distance between the free ends of said end wall flaps, said end wall flaps and the upstanding wall of said insert having a slotted interengagement.

2. A container comprising a bottom wall having cuts producing spaced opposed flaps, an insert comprising an upstanding wall and laterally directed bottom flanges, said bottom flanges extending along said bottom wall and under said flaps, and flaps on said container extending inwardly over said bottom wall, said upstanding wall of said insert having a length greater than the distance between the free ends of said flaps, said flaps and the upstanding wall of said insert having a slotted interengagement.

3. A container comprising a bottom wall having cuts producing spaced opposed flaps, an insert comprising an upstanding wall and laterally directed bottom flanges, said bottom flanges extending along said bottom wall and under said flaps, and a flap on said container adjacent an end of said insert and adjacent said bottom wall, said flap and the upstanding wall of said insert having a slotted interengagement.

4. A container comprising a bottom wall having cuts producing spaced opposed flaps, an insert comprising an upstanding wall and laterally directed bottom flanges, said bottom wall comprising tabs extending toward one another into said bottom wall flaps, said bottom flanges extending along said bottom wall and being located beneath said flaps and above said tabs, and end walls with flaps foldable inwardly so as to lie along said bottom wall, said upstanding wall of said insert having a length greater than the distance between the free ends of said end wall flaps, said end wall flaps and the upstanding wall of said insert having a slotted interengagement.

5. A container comprising a bottom wall having cuts producing spaced opposed flaps, an insert comprising an upstanding wall and laterally directed bottom flanges, said bottom wall comprising tabs extending toward one another into said bottom wall flaps, said bottom flanges extending along said bottom wall and being located beneath said flaps and above said tabs, and flaps on said container extending inwardly over said bottom wall, said upstanding wall of said insert having a length greater than the distance between the free ends of said flaps, said flaps and the upstanding wall of said insert having a slotted interengagement.

6. A container comprising a bottom wall having cuts producing spaced opposed flaps, an insert comprising an upstanding wall and laterally directed bottom flanges, said bottom wall comprising tabs extending toward one another into said bottom wall flaps, said bottom flanges extending along said bottom wall and being located beneath said flaps and above said tabs, and a flap on said container adjacent an end of said insert and adjacent said bottom wall, said flap and the upstanding wall of said insert having a slotted interengagement.

7. A container comprising a bottom wall having cuts producing spaced opposed flaps, an insert comprising an upstanding wall and laterally directed bottom flanges, said bottom flanges extending along said bottom wall and under said flaps, and a top wall having an opening, said insert comprising a pair of wall panels connected along one side by a foldline and flanges connected to the other sides of said wall panels by foldlines, said insert being formed exclusively from the material excised from said top wall to produce said opening.

8. In the container of claim 7, a flap on said container adjacent an end of said insert and adjacent said bottom wall, said flap and the upstanding wall of said insert having a slotted interengagement.

9. The container of claim 7, in which said bottom wall comprises tabs extending toward one another into said bottom wall flaps, said flanges of said insert being located beneath said flaps on said bottom wall and above said tabs, and in which said container comprises a flap adjacent an end of said insert and adjacent said bottom wall, said flap and the upstanding wall of said insert having a slotted interengagement.

10. A container comprising a top wall having an opening extending substantially the length thereof, side, bottom and end walls foldably connected to one another and defining said container proper, end flaps foldably connected to some of said walls and extending along said bottom wall to positions inside the ends of said openings, the free ends of said flaps having opposed outwardly directed slots, and an insert formed from a blank no larger in any dimension than said opening in said top wall, said insert comprising a pair of wall panels connected along one side by a foldline and flanges connected to the other sides of said wall panels by foldlines, said bottom wall having cuts producing spaced opposed flaps located beneath said top wall opening, said insert flanges extending along said bottom wall and under said bottom wall flaps, said insert wall panels extending up alongside one another from said bottom wall toward said top wall and the ends of said wall panels being received within said slots in said first mentioned flaps.

11. A container comprising a bottom wall having cuts producing spaced opposed flaps, and an insert comprising an upstanding wall and laterally directed bottom flanges, said bottom wall comprising tabs extending toward one another into said bottom wall flaps, said bottom flanges extending along said bottom wall and being located beneath said flaps and above said tabs.

12. A container comprising a bottom wall having cuts producing laterally spaced longitudinally extending opposed flaps, and an insert comprising an upstanding wall extending in a longitudinal direction and bottom flanges extending out beyond said upstanding wall in a lateral direction, said bottom flanges extending along said bottom wall and under said flaps, said bottom wall comprising tabs extending toward one another into said bottom wall flaps, said bottom flanges of said inserts being located beneath said flaps and above said tabs.

13. A container comprising a bottom wall having cuts producing spaced opposed flaps, an insert comprising an upstanding wall and laterally directed bottom flanges, said bottom flanges extending along said bottom wall and under said flaps, and a top wall having an opening, said insert comprising a pair of wall panels connected along one side by a foldline and flanges connected to the other sides of said wall panels by foldlines, said insert being formed exclusively from the material excised from said top wall to produce said opening, said bottom wall comprising tabs extending toward one another into said bottom wall flaps, said bottom flanges of said inserts being located beneath said flap and above said tabs.

References Cited in the file of this patent

UNITED STATES PATENTS

| | | |
|---|---|---|
| 1,549,111 | Grollman | Aug. 11, 1925 |
| 1,578,573 | Ballou | Mar. 30, 1926 |
| 1,823,285 | Petritsch | Sept. 15, 1931 |
| 2,270,084 | Schmidt | Jan. 13, 1942 |
| 2,306,078 | Nydegger | Dec. 22, 1942 |

FOREIGN PATENTS

| | | |
|---|---|---|
| 432,769 | Italy | Mar. 26, 1948 |